United States Patent
Castell et al.

[19]

[11] Patent Number: 5,964,850
[45] Date of Patent: *Oct. 12, 1999

[54] SYSTEM FOR INCREASING FUNCTIONALITY THROUGH A PREDEFINED INTERFACE BY USE OF AN INTERCONNECTION DEVICE TO SWITCH A NON-STANDARD ECHO CANCELLATION PROCESSOR ONTO THE INTERFACE

[75] Inventors: Robin T. Castell, Spring; G. Edward Newman, Tomball; Lee W. Atkinson, Houston; Kevin W. Eyres, Tomball; David J. Delisle, Spring, all of Tex.

[73] Assignee: Compaq Computer Corporation, Houston, Tex.

[ * ] Notice: This patent is subject to a terminal disclaimer.

[21] Appl. No.: 08/967,062

[22] Filed: Nov. 10, 1997

Related U.S. Application Data

[63] Continuation of application No. 08/565,717, Nov. 30, 1995, Pat. No. 5,768,615.

[51] Int. Cl.⁶ ............... G06F 13/00; H04B 3/20; H04M 11/00
[52] U.S. Cl. ............ 710/14; 370/286; 375/222; 379/93.05; 710/102; 710/129
[58] Field of Search .............. 375/222; 379/93.05; 395/282, 309, 834, 821; 710/102, 129, 14, 1; 370/286

[56] References Cited

U.S. PATENT DOCUMENTS

| | | | |
|---|---|---|---|
| 5,276,443 | 1/1994 | Gates et al. | 340/825.06 |
| 5,701,515 | 12/1997 | Gradeler | 395/834 |
| 5,752,082 | 5/1998 | Staples | 395/882 |

*Primary Examiner*—Thomas C. Lee
*Assistant Examiner*—Albert Wang
*Attorney, Agent, or Firm*—Jenkins & Gilchrist P.C.

[57] ABSTRACT

A method and apparatus for increasing system functionality through a predefined interface is disclosed. Signal lines which are not used or which are not used in certain modes are connected to an interconnection device instead of being connected to an interface wherein the output of the interconnection device is connected to the interface where such lines would have been connected. The interconnection device also has a set of inputs for receiving signals from a device providing the desired functionality. A controller chooses between the two sets of inputs to control what signal lines are connected to the predefined interface. Accordingly, during certain modes of operation, the added functionality from a device whose output is being switched into the interface can be supported. In one embodiment, speaker phone capability is provided for even though the predefined PCMCIA interface does not support such capability. The disclosed design continues to maintain capability with all systems adapted to be used with such predefined interface.

7 Claims, 4 Drawing Sheets

SYSTEM FOR INCREASING FUNCTIONALITY THROUGH A PREDEFINED INTERFACE BY USE OF AN INTERCONNECTION DEVICE TO SWITCH A NON-STANDARD ECHO CANCELLATION PROCESSOR ONTO THE INTERFACE

This application is a continuation of application Ser. No. 08/565,717, filed Nov. 30, 1995, now U.S. Pat. No. 5,768,615.

BACKGROUND OF THE INVENTION

1. Technical Field of the Invention

This invention relates to signal transmission and more particularly to the transmission of control signals or of data signals from one device to another through a predefined interface.

2. Description of Related Art

Compatibility between products supplied by different vendors has become a very important concern to vendors as well as consumers in recent years as computer technology has converged to the point that a few significant product suppliers play a major role in defining standards and architectures for the rest of industry to follow. Along these lines the marketplace has established standards for audio circuitry, for example, SoundBlaster compatible audio devices, for so-called plug and play automatic configuration, and for communications interfaces including external modems, internal modems, and PCMCIA modem cards, which are typically used with portable computers. With the particular example of PCMCIA modem cards, predefined interfaces and performance standards allow different vendors of PCMCIA modem cards to produce products which are compatible with computers produced by the various computer vendors. Thus, the use of such standard and predefined interfaces for PCMCIA cards leads to a greater supply at lower prices.

A drawback, however, to the use of predefined interfaces and to developing market compatible products is that change is often slow, thereby resulting in long term performance limitations. The reason, of course, is that change must be accompanied by changes in standards. Thus, new capabilities are often precluded from being incorporated into new products because their inclusion would require additional non-standard circuitry and non-standard interfaces. To include new functionality, vendors often design circuitry which requires special wiring and additional non-standard interfaces.

Current PCMCIA modem cards and established interfaces do not support speaker phone capability. Accordingly, to include speaker phone capability into a computer which utilizes PCMCIA modem cards, a designer has one of at least three possible design implementation choices, each of which includes non-standard circuitry. First, the designer could embed speaker phone circuitry onto the system board of the computer. With this implementation, the system microphone and speaker signals are available to the modem and there is no interconnection requirement. However, a disadvantage of such an approach is that the embedded modem hardware is fixed and can not be upgraded. Moreover, such an embedded implementation will have a larger overall system size and increased system power requirements and power supply size and cost.

A second technique for including speaker phone capability through PCMCIA modem cards involves using a proprietary module and proprietary interface. An advantage to this solution is that the manufacturer has complete freedom to design an interconnect scheme. However, such a design results in non-compatibility and therefore lower demand in the marketplace given the market's overall emphasis toward compatibility. A third possible implementation includes utilizing an external speaker and microphone instead of the system microphone or speaker and to provide a connection, also known as an umbilical cord, from the external speaker and microphone to the onboard modem. Disadvantages of this implementation, however, include increased size and cost, and inconvenience and unsightliness (with a dangling cord) of the additional speaker/microphone unit.

Thus, while it is advantageous to utilize predefined interfaces to achieve compatibility between the products of the various vendors, it is often difficult to achieve increased functionality without unnecessarily adding to the complexity of circuitry, increasing power and space requirements for the circuitry which supports the new functionality, and without creating a noncompatible device. As discussed above, the solutions around fixed interfaces frequently involve having duplicative equipment with extra cabling, as in the case of the umbilical cord, thereby affecting the appearance as well as ease of use of the given system. Thus, what is needed is an apparatus and a method of utilizing existing predefined interfaces in a manner which continues to maintain compatibility between the products of the various vendors but which also can increase the functionality of a system utilizing the predefined interface.

SUMMARY OF THE INVENTION

An apparatus and method are disclosed in which functional capabilities normally precluded by a predefined interface can be achieved by the use of a controllable interconnection device in which signals from a device providing the desired functionality are switched into a signal path and predefined interface during modes of operation in which such switching does not otherwise affect operation.

More specifically, the switched signal lines are those which either are unused or are unused during certain modes of operation. For example, in a modem application wherein a predefined interface contains at least one address line which is not used in at least certain modes of operation, the invention includes connecting such unused address lines to a set of inputs of an interconnection device instead of connecting such unused address lines to the predefined interface. A corresponding number of output lines of the interconnection device are connected to the predefined interface at the locations to which the unused address lines are supposed to be connected. Additionally, another set of inputs of the interconnection device is connected to the outputs of a device providing the desired functionality. It is understood of course, that bidirectional signal flow is intended through the interconnection device and through the predefined interface. The terms "input" and "output" are not intended to reflect solely one direction of signal flow. Rather, the terms are used to simplify the explanation of the electrical connections.

Control of the interconnection device, in one embodiment of the invention, is provided by a control processor which is connected to at least one control line input of the interconnection device to provide control signals for controlling the opened/closed state(s) of the interconnection device. Thus, during modes of operation in which at least one address line is not used by a signal generator and an interconnection device with at least one control line is incorporated into the circuit as described above, the control processor sends a control signal to the interconnection device to open the path between the address line and the output line and to close the path between the output line and the device providing the desired functionality. The control processor is in communication with the signal generator to determine whether the current mode of operation is one which is compatible with the desired functionality and to determine that the mode of operation is one in which the address line is not going to be used to transmit data by the signal generator.

One application of the invention herein is to add speaker phone capability to a system utilizing a PCMCIA modem card. The problem of the fixed and predefined PCMCIA interface not having defined signals and circuitry to support speaker phone functionality is overcome by the invention herein. Specifically, a sound system which includes a microphone, a processor and a speaker is switched into a data path ordinarily used for address lines. Because a PCMCIA modem card does not use such upper end address lines, the invention includes using such lines for bi-directional transmission of audio and control signals through the predefined PCMCIA interface.

On the other side of the interface, namely the PCMCIA modem card side, circuitry is added which receives such signals and performs additional processing of such signals prior to passing such signals to the PCMCIA modem for transmission over the phone line. Such circuitry includes a digital signal processor for performing acoustic echo cancellation and a switch to open up the signal path which carries such signals whenever the speaker phone functionality is not in use.

The invention also includes having circuitry, in another embodiment, wherein an additional interconnection device for switching the lines is used to carry the additional signals back to their corresponding lines whenever the system is not being used to achieve the added functionality. In this embodiment, the additional interconnection device is placed between the PCMCIA interface and the digital signal processor.

The inventive methods include determining if a PCMCIA modem card has been plugged into a PCMCIA modem card slot which has the additional circuitry wired thereto to achieve the added functionality, determining if the desired system mode is one which relates to the added functionality, and, if so, performing the necessary switching to switch in the circuitry which relates to the added functionality. If the circuitry being added is a speaker phone system, then the inventive method includes converting sound to audio signals at a microphone, digitizing such signals, transmitting such digitized signals through an interconnection device to a PCMCIA interface, transmitting such signals through the interface and through the switch or interconnection device on the modem card side of the interface to a digital signal processor, performing acoustic echo cancellation, transmitting the resulting signals to the PCMCIA modem data pump, converting the received signals to a format for modem transmission, such format usually being analog, and then transmitting the converted signals over the phone line.

The inventive method also includes receiving audio signals over a phone line at the PCMCIA modem card, digitizing such signals and transmitting such signals back to the speaker phone sound system through the switch on the modem card side of the interface, through the PCMCIA interface, through the interconnection device and through the speaker phone system in which such signals are converted back to analog and played over a speaker.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF A PRESENTLY PREFERRED EXEMPLARY EMBODIMENT

Figure 1:
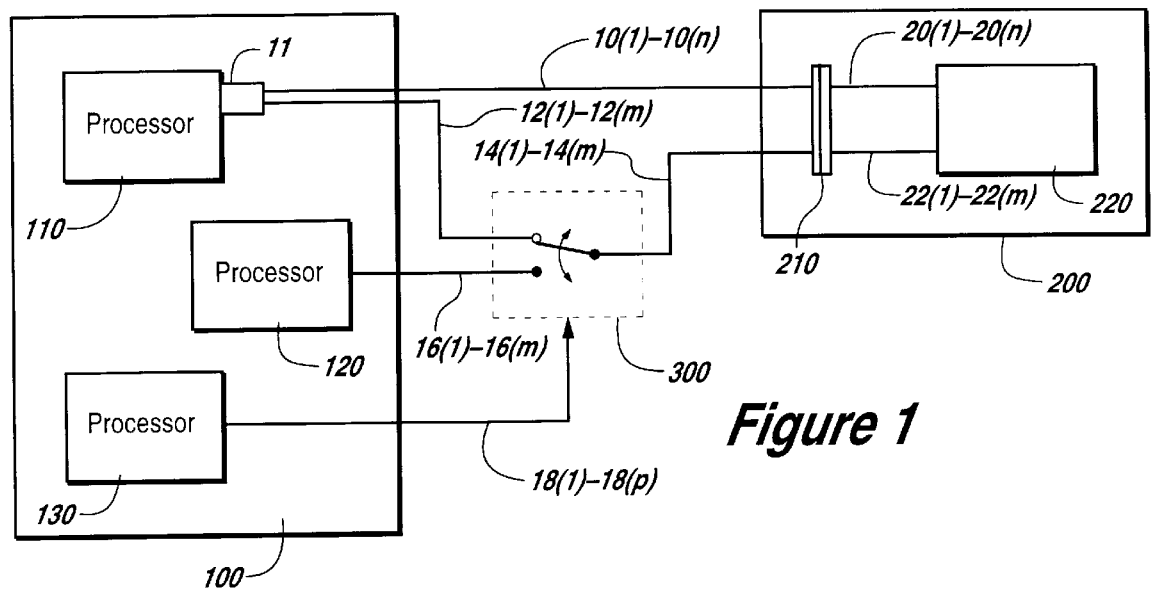
FIG. 1 is a block diagram representing one embodiment of the invention.

Referring to FIG. 1, there is shown a block diagram illustrating one embodiment of the invention wherein a computer system 100 is coupled to an external system 200 through an interconnection device 300. More specifically, a plurality of lines 10(1)–10(n) and 12(1)–12(m) originate from harness 11 which is connected to processor 110. Lines 10(1)–10(n) are connected directly to a predefined interface 210 of external system 200 while lines 12(1)–12(m) are coupled to external system 200 through interconnection device 300. In the prior art systems, lines 12(1)–12(m) which are a part of harness 11 are connected directly to predefined interface 210. However, interconnection device 300, as shown in FIG. 1, also has a set of outputs connected to a plurality of lines 14(1)–14(m) which connect interconnection device 300 to predefined interface 210 of external system 200. Additionally, interconnection device 300 has a second set of inputs connected to a plurality of lines 16(1)–16(m). Interconnection device 300 operates in a manner so that either the signals on lines 12(1)–12(m) or those on lines 16(1)–16(m) are passed through to external system 200 through lines 14(1)–14(m) according to the coupling performed within interconnection device 300.

Continuing to refer to FIG. 1, interconnection device 300 is graphically represented by a single pole double throw switch since the figure of FIG. 1 only shows one line for lines 12(1)–12(m), one line for lines 14(1)–14(m), and one line for lines 16(1)–16 (m). It is understood, however, that the electrical relationship shown for interconnection device 300 in FIG. 1 is the relationship for all of the lines 12(1)–12(m), 16(1)–16(m) and 14(1)–14(m). The particular single pole double throw switch of interconnection device 300 shown in FIG. 1 is an electronic switch which is controlled by computer system 100 wherein computer system 100 sends control signals over lines 18(1)–18(p) to affect the coupling arrangement of interconnection device 300.

There are many alternative devices and designs which may be used to perform switching in place of interconnection device 300. For example, interconnection device 300 could be comprised of a multiplexer of a plurality of line buffers, each being individually controlled of a single or plurality of electronically controlled relay switches, or even a plurality of manually operated single pole double throw switches. If, by way of example, lines 12(1)–12(m) are comprised of four separate lines, as are lines 16(1)–16(m) and lines 14(1)–14(m), then it is important that the interconnection device 300 be able to connect the four output lines 14(1)–14(m) either to the four input lines 12(1)–12(m) from processor 110 of computer system 100 or to lines 16(1)–16(m) from processor 120.

Continuing to refer to FIG. 1, lines 10(1)–10(n), 12(1)–12(m), 16(1)–16(m) and 18(1)–18(p) are shown to be coupled to computer system 100. Further, as is shown, computer system 100 is comprised of a processor 110, a processor 120 and a control processor 130. As may be seen therefore, lines 10(1)–10(n) and 12(1)–12(m) originate from processor 110 and, more specifically, from harness 11 which originates from processor 110, while lines 16(1)–16(m) originate from processor 120 and lines 18(1)–18(p) originate from control processor 130. As shown in the embodiment of FIG. 1, each of these processors 110, 120 and 130 are all a part of computer system 100. However, they could just as readily be completely independent systems which are in communication with each other over lines not shown here in FIG. 1. Similarly, external system 200 could be one device or it could be comprised of a plurality of different devices. For example, as is shown in FIG. 1, external system 200 is comprised of an interface 210 which is connected to lines 10(1)–10(n) and 14(1)–14(m) on one side and to lines 20(1)–20(n) and 22(1)–22(m) on the other side wherein lines 20(1)–20(n) and 22(1)–22(m) are also connected to a receiver 220. Receiver 220, in turn, could either be a final destination for the signals transmitted over lines 20(1)–20(n) and 22(1)–22(m) or, alternatively, receiver 220 could merely be a device which manipulates the data for transmission to another system. For example, receiver 220 could be a modem which receives data over lines 20(1)–20(n) and 22(1)–22(m) and transmits such data over a plurality of lines not shown in FIG. 1.

The system of FIG. 1, as stated before, includes interface 210, which interface 210 is used to connect processor 110 of computer system 100 to receiver 220. If all the signal lines of harness 11 of processor 110 are connected directly to the interface 210, then the overall system functions are limited by a predefined interface configuration of interface 210. Thus, if interface 210 is arranged according to an industry standard, then only standard functionality may be provided for by a given system. However, with the inclusion of interconnection device 300 connected between processor 110 and interface 210, non-standard functionality may be provided for by devices such as processor 120 which are switched into interface 210 by interconnection device 300. By way of example, if lines 12(1)–12(m) of processor 110 are comprised of four lines which are unused in some or all modes of operation, then any additional device which requires four signal lines or less can be switched into interface 210 by interconnection device 300 whenever processor 110 is operating in a mode wherein lines 12(1)–12(m) are not being utilized.

In one embodiment by way of example, lines 12(1)–12(m) consist of four unused address lines, receiver 220 is a modem, and processor 120 is a digital microphone system which is connected to interconnection device 300 to provide digitized audio to interface 210 for transmission by receiver 220 over a phone line. Thus, as may be seen in FIG. 1, an apparatus is described wherein unused signal lines in a predefined interface may be connected to external devices to add new capabilities to a given system. In such embodiment, control processor 130 determines whether lines 12(1)–12(m) of processor 110 or lines 16(1)–16(m) of processor 120 are connected to interface 210 by lines 14(1)–14(m). Control processor 130 makes such as a determination by communicating with processor 110 to determine if the mode of operation is one in which the functionality of processor 120 is to be included. Thus, if lines 12(1)–12(m) are not used for certain types of devices, such a modem, then control processor 130 may open the connection between lines 12(1) –12(m) and lines 14(1)–14(m) and close the connection between lines 16(1)–16(m) and lines 14(1)–14(m) to couple the processor 120 to external system 200 to allow for the added functionality.

In the above discussion and examples of FIG. 1, lines 12(1)–12(m) have been represented as consisting of four lines for one embodiment. Lines 12(1)–12(m) could, just as easily, consist of one line or many lines, by way of example, 12 lines. As is shown by the discussion regarding FIG. 1, a capability provided by the embodiment of FIG. 1 wherein additional devices may be switched into a predefined interface such that underutilized or unused lines are connected to the external device for providing a capability not supported by the predefined interface, in this case, interface 210.

Figure 2:
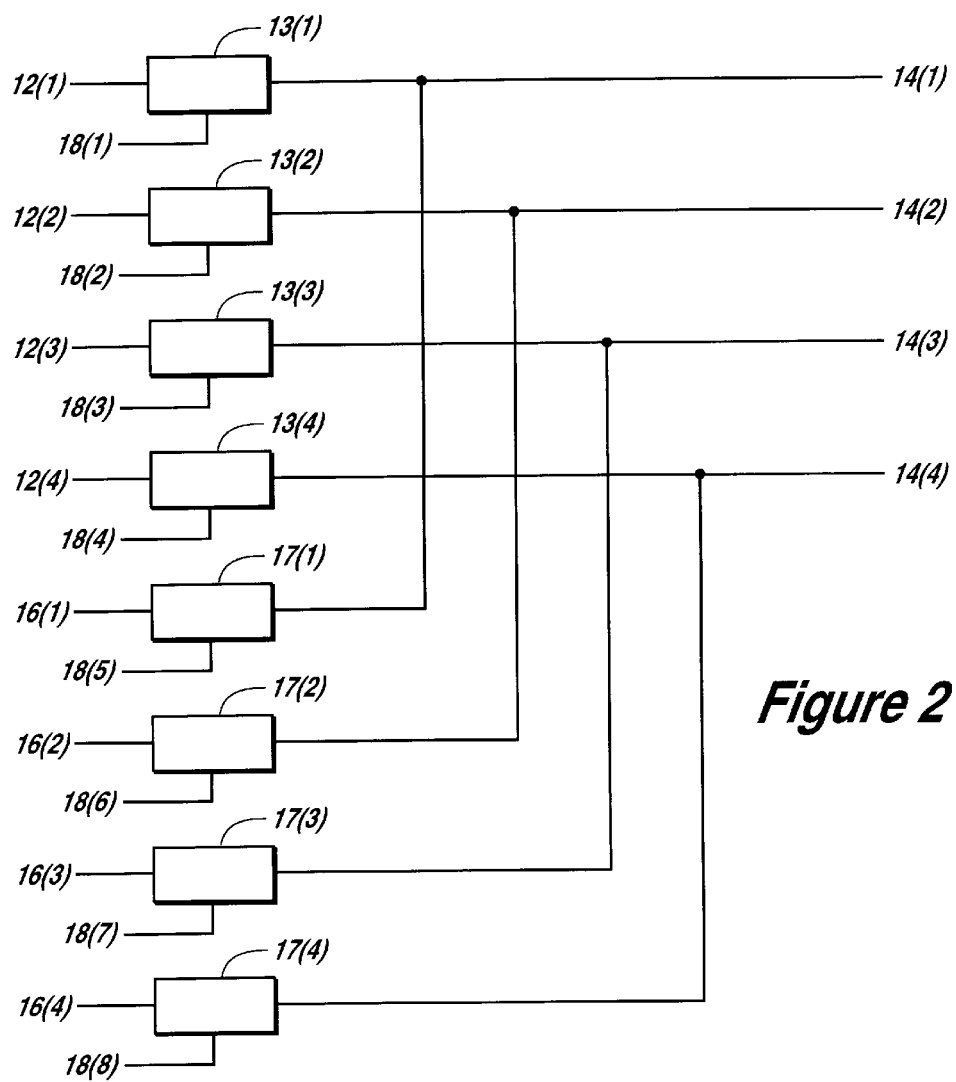
FIG. 2 is a block diagram representing one embodiment of the interconnection device circuitry.

Referring now to FIG. 2, there is shown an embodiment wherein lines 12(1)–12(4) and 16(1)–16(4) are each connected to the inputs of line drivers 13(1)–13(4) and 17(1) –17(4), respectively. The outputs of line drivers 13(1) and 17(1) are coupled to line 14(1); 13(2) and 17(2) are coupled to 14(2); 13(3) and 17(3) are coupled to 17(3); and 13(4) and 17(4) are coupled to 14(4). As may be seen in FIG. 2, each line driver 13(1) and 17(1) requires individual control. Control signals for line drivers 13(1)–13(4) are received on lines 18(1)–18(4), respectively, while line drivers 17(1)–17(4) receive control signals on lines 18(5)–18(8), respectively. Each of the control lines 18(1)–18(8) are connected to control processor 130 of FIG. 1 which provides for individualized control of the line drivers 13(1)–13(4) and 17(1) and 17(4). Moreover, as may be understood, control processor 130 operates to control line drivers 13(1)–13(4) and 17(1)–17(4) such that line drivers 13(1) through 13(4) are all opened or closed at the same time while line drivers 17(1) through 17(4) are all opened or closed at the same time and have a steady state logic condition which is opposite to line drivers 13(1) through 13(4).

Figure 3:
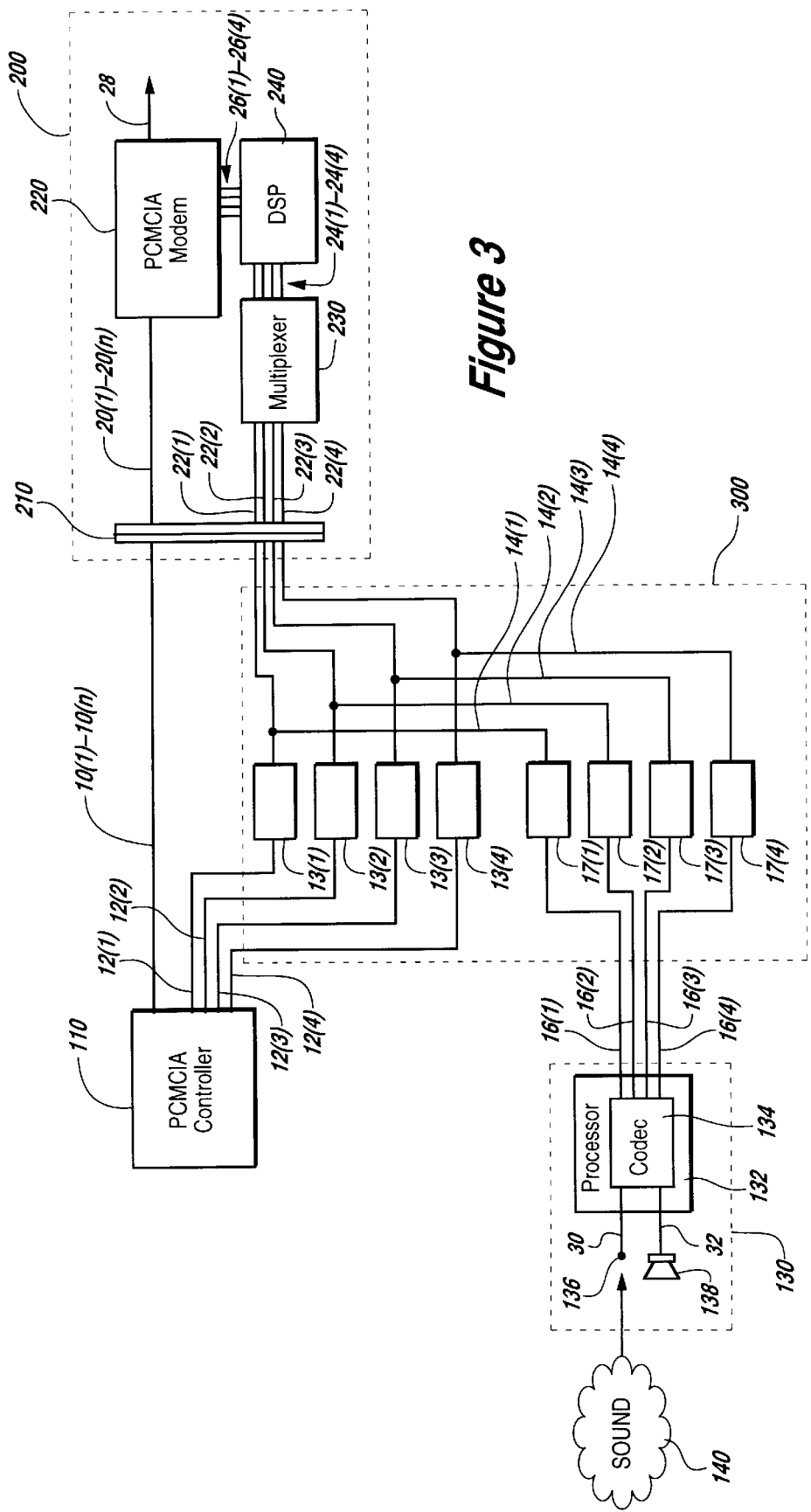
FIG. 3 is a block diagram representing one embodiment of the invention which includes a speaker phone system.

Referring now to FIG. 3, there is shown another embodiment of the invention. Specifically, processor 110 of FIG. 1 is a PCMCIA controller in this embodiment. The receiver 220 of FIG. 1 is a PCMCIA modem 220. Also included in this embodiment is an interface 210, a multiplexer 230 and a digital signal processor 240. Lines 22(1)–22(4) connect the interface 210 to multiplexer 230 while lines 24(1)–24(4) connect multiplexer 230 to digital signal processor 240 and lines 26(1)–26(4) connect digital signal processor 240 to PCMCIA modem 220. Finally, PCMCIA modem 220 also receives an input from interface 210 over lines 20(1)–20 (n) and produces an output over line 28.

As may be seen from referring to FIG. 3, the interconnection device 300 of FIG. 1 is comprised of the plurality of line drivers illustrated in FIG. 2. The control lines 18(1)–18 (8) for each of the eight line drivers, 13(1)–13(4) and 17(1)–17(4) and their connection to control processor 130 is not shown in FIG. 3 in order to simplify the figure. However, it is understood that such connections exist as is shown in FIGS. 1 and 2.

Continuing to refer to FIG. 3, and more specifically to the control processor 130 of FIG. 1, it may be seen that control processor 130 is, in this embodiment, comprised of a sound processor 132, a codec 134, a microphone 136 and a speaker 138. Microphone 136 is connected to sound processor 132 by line 30 while speaker 138 is connected to sound processor 132 by line 32. As may be seen, sound 140 propagates toward microphone 136 which then converts such sound to analog signals and transmits the same over line 30 to sound processor 132. Sound processor 132 manipulates the signals and transmits them to codec 134 to digitize the analog signals for transmission to the PCMCIA modem 220. More specifically, codec 134 of sound processor 132 is connected to four lines 16(1)–16(4) wherein one line is used for transmitting digitized data to the PCMCIA modem 220 through interface 210, one line is for receiving data from PCMCIA modem 220, one line is for synchronization and another produces clock pulses to facilitate timing of communications. Thus, the digitized sound from microphone 136 is transmitted on one data line while data received on another data line is transmitted to speaker 138 over line 32.

Referring now to external system 200, it is seen that external system 200 comprises a multiplexer 230. In this particular embodiment, what is referred to as multiplexer 230 is actually a true bi-directional CMOS switch which is capable of bi-directional transmission of analog or digital signals. One advantage of using a bi-directional CMOS switch is that insertion delays to the signal processing are minimized with such a type of switch. For example, it is known that such bi-directional CMOS switches introduce lower propagation delays than do the various line drivers also utilized here in this invention. In this particular embodiment, multiplexer 230 is a CMOS switch. Accordingly, lines 22(1)–22(4) are left open when the system of FIG. 3 is not operating in a speaker phone mode. If lines 12(1)–12(4) were lines that are actually used in various modes, then it would be necessary to have an arrangement for multiplexer 230 that is similar to interconnection device 300 so that the predesigned data path to PCMCIA modem 220 could be closed during non-speaker phone modes of operation. However, since lines 12(1)–12(4) represent address lines A22–A25, which address lines are not used by a PCMCIA modem 220, it is sufficient to allow such lines to float or be left open when the system is not operating as a speaker phone.

As is also shown in FIG. 3, external system 200 is comprised of a digital signal processor 240 which is connected between the PCMCIA modem 220 and the bi-directional CMOS switch 230. The primary purpose of digital signal processor 240 is to perform the task of what is known as an "acoustic echo cancellation" which primarily removes sound generated at microphone 136 from transmission back to sound processor 132 to avoid feedback. Thus, a person listening to speaker 138 would not hear the system playback his own voice. However, that person's voice would be transmitted to the PCMCIA modem 220 by digital signal processor 240 for transmission over line 28 to another device such as another PCMCIA card, or modem or telephone. One skilled in the art can readily appreciate the use and connection of a digital signal processor to perform the task of acoustic echo cancellation for a modem application.

One skilled in the art can also readily appreciate that the various structural elements specified in the embodiment of FIG. 3 can be substituted with similar and equivalent structures. By way of example, CARDBUS, ISA, EISA and MicroChannel may be substituted in place of PCMCIA interface and corresponding hardware described herein.

Figure 4:
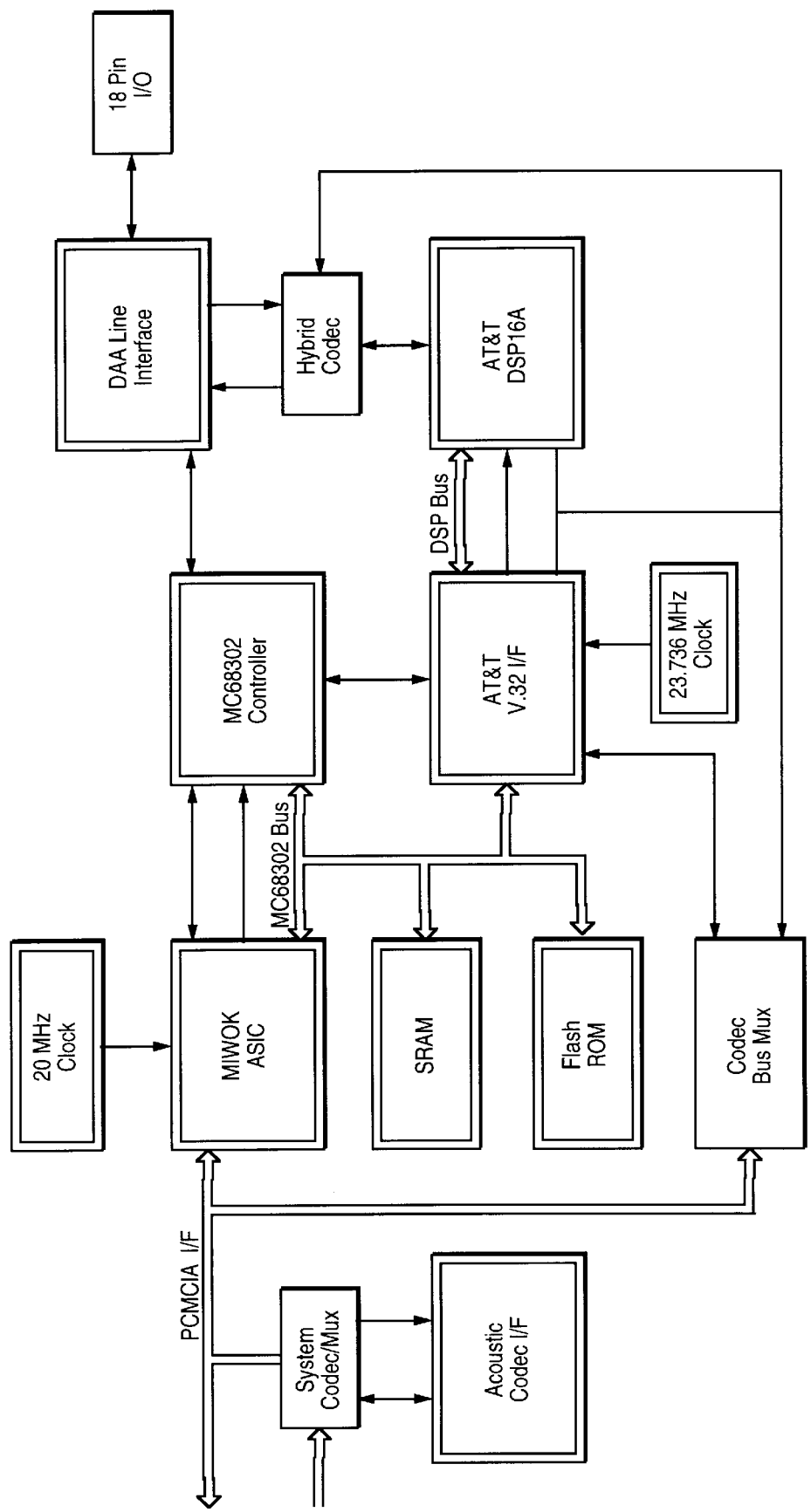
FIG. 4 is a schematic block diagram of a PCMCIA modem card.

Referring now to FIG. 4, there is shown a schematic which illustrates the actual parts and interconnections of parts of the circuitry of the external device 200 of FIGS. 1 and 3.

Figure 5:
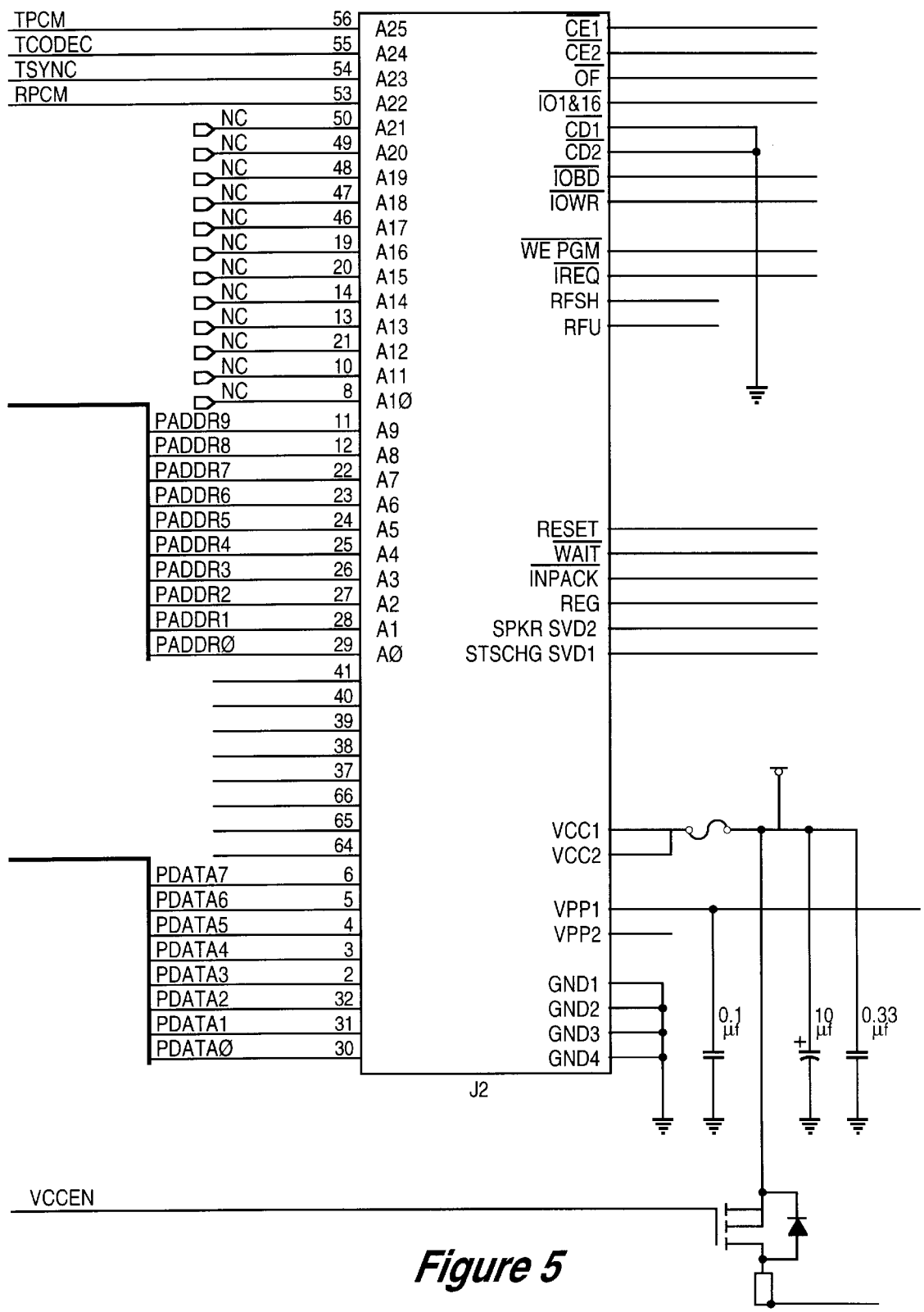
FIG. 5 is a diagram which illustrates the predefined interface layout for the PCMCIA interface.

Referring now to FIG. 5, there is shown a schematic detailing the actual layout of the PCMCIA connector which has been illustrated as interface 210 in FIGS. 1 and 3. As may be seen, the PCMCIA connector J2 contains twenty-six address lines A0–A25. In the particular embodiment of FIG. 3, lines 12(1)–12(4) originating from PCMCIA controller 110 are the four lines that would ordinarily connect to address lines A22–A25. Thus, depending upon the opened/closed state of line drivers 13(1)–13(4) and 17(1)–17(4), either lines 12(1)–12(4) of PCMCIA controller 110 or lines 17(1)–17(4) from codec 134 are connected to address lines A22–A25 of interface 210 of FIG. 5. These particular address lines are normally not used except in systems utilizing extended memory. They are not used by PCMCIA modem cards. This is because the memory addressing scheme for PCMCIA modem cards utilizes only the lower addresses. For these reasons, these lines are good candidates for increasing functionality as is disclosed in this application. It is believed that the alternate use of address lines A22–A25 to support the transmission of digitized sound and corresponding control signals poses no conflicts. It is understood, of course, that other address lines could be used or even other control or signal lines could be used in addition to or in place of these four address lines A22–A25.

One benefit of the invention disclosed herein is that new functionality can be added to existing systems having interfaces which do not support such functionality. An example of this, of course, is shown by the embodiment disclosed above, wherein speaker phone capability is added to a system whose predefined interfaces do not normally support such functionality. Moreover, not only is such functionality added by the apparatus and methods of the invention, but it is added in such a way which does not interfere with the ordinary functioning of the system to which the functionality is being added, nor does it affect compatibility with other systems. Specifically, such apparatus and method includes utilizing signal lines which are defined in the PCMCIA interface, but which either are not used or are not used in certain modes of operations. For example, in the embodiment described above in which speaker phone capability was added to a system utilizing a PCMCIA interface and PCMCIA modem card, four upper end address lines A22–A25 which are not ordinarily used by the PCMCIA interface were instead connected to an interconnection device. The interconnection device 300 was also connected to the speaker phone system 130 of FIG. 3. As such, the interconnection device 300 either created a circuit path from the PCMCIA controller 110 to the PCMCIA interface 210 or a path from the speaker phone system 130 of FIG. 3 to the PCMCIA interface 210 depending upon system mode and system operation. In this particular embodiment, address lines A22–A25 are unused by the PCMCIA modem 220 of FIG. 3. Thus, whenever a speaker phone mode is entered into by the system, a connection is created between the PCMCIA modem 220 and the speaker phone system 130 in which other operations are not interfered with. Such interference does not exist because the speaker phone system may transmit and receive audio information and related control signals simultaneous to any and all other signal and data transmissions through the PCMCIA interface 210 by the PCMCIA controller 110 and by the PCMCIA modem 220. Thus, this system does not interfere with ordinary signal transmissions as would another solution, for example, true multiplexing of signals from different sources through the PCMCIA interface 210.

Another benefit of the apparatus and method disclosed herein is that full compatibility with other systems continues to exist. Given the nature of the connections and methods of the inventions herein, such added functionality is transparent to other systems not adapted to support such as added functionality. Thus, if a PCMCIA modem card does not have the additional systems, such as multiplexer 230 and digital signal processor 240 of FIG. 3, as well as associated control software in the PCMCIA modem 220, then control processor 130 of FIGS. 1 and 2 would not switch-in speaker phone system 135. Moreover, because address lines A22–A25 are not ordinarily used by PCMCIA modem cards, the ordinary and predefined operation of PCMCIA modem 220 as supported by the predefined interface is unaffected by the opened/closed status of lines 22(1)–22(4).

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A system for increasing functionality through a predefined interface, comprising:

a first signal generator for generating and transmitting a predefined first set of signals to a predefined interface, said predefined first set of signals conforming to said predefined interface;

a second signal generator for generating and transmitting a second set of signals which does not conform to said predefined interface;

an interconnection device for receiving said second set of signals from said second signal generator and for receiving a subset of said predefined first set of signals from said first signal generator and for outputting to said predefined interface either said subset of said predefined first set of signals or said second set of signals a signal processor for performing acoustic echo cancellation;

a switch connected between said single processor and said predefined interface such that said signals output from said interconnection device are transmitted through said predefined interface to said switch, and if said switch is closed, to said signal processor to perform acoustic echo cancellation on said signals.

2. The system of claim 1 wherein said interconnection device comprises at least one control input and wherein the system of claim 1 further comprises a controller coupled to said control input for providing control signals to said interconnection device to facilitate the coupling within said interconnection device.

3. The system of claim 2 which further comprises a PCMCIA modem card wherein said predefined interface is coupled between said PCMCIA modem card and said first signal generator and said interconnection device.

4. The system of claim 1 wherein said predefined interface is selected from the group consisting of CARDBUS, ISA, EISA and MicroChannel.

5. The system of claim 3 wherein said first signal generator is a PCMCIA controller.

6. The system of claim 5 wherein said second signal generator is a sound system capable of producing digitized sound.

7. The system of claim 6 wherein said sound system is a speaker phone system.

* * * * *